(12) United States Patent
Yu et al.

(10) Patent No.: US 6,345,811 B1
(45) Date of Patent: Feb. 12, 2002

(54) COMBINED PACKING-TRAY IN A VAPOR-LIQUID CONTACTING TOWER AND A PROCESS FOR EFFECTING OPERATION WITH HIGH CAPACITY AND HIGH TURNDOWN RATIO

(75) Inventors: Xiaomei Yu; Jun Tian; Jiazhong Zhu; Ou Li; Zuming Zheng; Kejian Yao, all of Haugzhou (CN)

(73) Assignees: China Petro-Chemical Corporation, Beijing; Zhejiang University of Technology, Hangzhou, both of (CN)

( * ) Notice: Subject to any disclaimer, the term of this patent is extended or adjusted under 35 U.S.C. 154(b) by 0 days.

(21) Appl. No.: 09/472,336

(22) Filed: Dec. 27, 1999

Related U.S. Application Data

(63) Continuation-in-part of application No. 09/054,083, filed on Apr. 2, 1998, now abandoned.

(30) Foreign Application Priority Data

Apr. 3, 1997 (CN) ............................................ 97103868

(51) Int. Cl.[7] .................................................. B01F 3/04
(52) U.S. Cl. ...................... 261/97; 261/113; 261/114.1; 261/114.3; 203/40

(58) Field of Search ................................ 261/94, 96, 97, 261/110, 114.1, 114.3, 114.4, 114.5; 202/197; 203/40, 39

(56) References Cited

U.S. PATENT DOCUMENTS

| | | | | | |
|---|---|---|---|---|---|
| 5,244,604 | A | * | 9/1993 | Miller et al. | 261/114.1 |
| 5,262,094 | A | * | 11/1993 | Chuang | 261/114.1 |
| 5,308,451 | A | * | 5/1994 | Carland | 261/114.4 |
| 5,366,666 | A | * | 11/1994 | Chuang et al. | 261/97 |
| 5,407,605 | A | * | 4/1995 | Resetarits et al. | 261/114.3 |
| 5,591,241 | A | * | 1/1997 | Lavin | 261/114.3 |

* cited by examiner

Primary Examiner—C. Scott Bushey
(74) Attorney, Agent, or Firm—Anderson Kill & Olick; Eugene Lieberstein; Michael Meller

(57) ABSTRACT

A vapor-liquid contacting tower having a tray deck, at least one downcomer and a structure packing layer in the space under the vapor-liquid bubble contacting tray wherein the tray deck has an opening such that vapor ascends upward through the opening to come into contact with the liquid flowing across the tray deck to form a froth in which the vapor and the liquid on the tray deck creates cross-flow bubble contact and with the structural dimensions of the tray deck and downcomer providing for at least 90 vol % of the total liquid flowing across the tray deck flows downwardly through the downcomer to the adjacent deck.

25 Claims, 4 Drawing Sheets

1. TOWER WALL  2. DOWNCOMER
3. PACKING     4. TRAY
5. LIQUID      6. VAPOR

■ WITH PACKING COMBINATION
▲ NO PACKING COMBINATION

COMBINED PACKING-TRAY IN A VAPOR-LIQUID CONTACTING TOWER AND A PROCESS FOR EFFECTING OPERATION WITH HIGH CAPACITY AND HIGH TURNDOWN RATIO

This application is a continuation-in-part of U.S. patent application Ser. No. 09/054,083, filed Apr. 2, 1998, now abandoned.

FIELD OF THE INVENTION

The present invention relates to a combined packing-tray used in a vapor-liquid contacting tower, wherein a structure packing layer is located in the space under the vapor-liquid bubble contacting tray, a downcomer extends downward through the tray, the packing layer is located at the waist of the outside of the downcomer, and also to a process for effecting operation with high capacity and high turndown ratio by using the combined packing-tray.

BACKGROUND ART

Vapor-liquid contacting towers are used to separate special components from a multi-component mixture. Generally speaking, the vapor-liquid contacting towers employ trays, packings or their combination. The combination of random or structure packings and trays facilitates to improve the separation efficiency of components in the mixture. In recent years, new development has been made in the combined technique of tray and packing.

G. X. Chen, A. Afacan, C. Xu and K. T. Chuang proposed a combination of metal knitted mesh packing with conventional sieve tray, the packing being put on the tray [*The Canadian Journal of Chemical Engineering*, Vol. 68, June, 1990]. The packing acts for emulsifying the liquid, uniformizing the bubbles on the tray deck, and enlarging the vapor-liquid contacting area and thereby raising the tray efficiency, but it is less effective for enhancing the capacity through the tray.

Kejian Yao, Jianbing Ji, et al. discloses a method for combining structure packing under the dual-flow tray, which offers primary advantages of enhancing the high efficiency film mass transfer zone and improving the mass transfer efficiency in the bubbling zone on the tray deck. It is a highly efficient combination [*Chemical Engineering*, Vol. 20, No. 6, Dec. 25, 1992]. However, the turndown ratio and load capacity are limited due to its low liquid capacity of the dual-flow tray.

U.S. Pat. No. 5,366,666 discloses a combined random packing under a rectangular multiple downcomer tray (abbreviated as MD tray). However, it was testified in a heat simulation unit by UOP that it is hard for this combined tray to offer uniform fluid distribution. This structure needs to be improved.

U.S. Pat. No. 5,262,094 to K. T. Chuang et al. discloses a combined structure of packing and a dual-flow tray. The combined packing-tray is limited in industry application because the dual-flow tray has its inherent disadvantages of small liquid capacity and low turndown ratio. In an attempt to enhance the capacity and the turndown ratio, Chuang proposes employing a dual-flow tray with downcomer to allow 25%–70% of the liquid to flow downward through the opening of the tray deck onto the adjacent tray deck below and the remaining liquid to flow downward through the downcomer. However, in order to ensure that 25–70% of the total liquid weeps down through the opening of the tray deck, the opening proportion in the tray deck must be still very large, so that the vapor speed through the opening is far lower than the vapor speed at the weeping point, i.e., the stability coefficient (the ratio of the operating vapor speed through the opening to the vapor speed at the weeping point) is below 0.5. If the tower operates under conditions of a very low stability coefficient, the operating stability of the tower is very poor. Once the fluctuation of the load in practice causes the variation of the liquid weeping through the opening of the tray deck, the liquid entering into the downcomer follows to variate. When the load of the gas increases, the amount of the liquid weeping through the opening of the tray deck will drop immediately and the split-flow liquid through the dowacomer will increase sharply such that the liquid can not flow downward through the downcomer and flooding will take place. In the case of a low load of the gas, the amount of the liquid flowing through the downcomer increases and the split-flow through the downcomer is so small that the downcomer can not self-seal. The vapor ascends through the downcomer, and there is no liquid layer on the tray deck, resulting in reduced mass transfer efficiency. Thus, the combined packing-tray with a downcomer as defined in U.S. Pat. No. 5,262,094 can not have a higher capacity and a higher turndown ratio.

U.S. Pat. No. 5,407,605 to Resetarits et al. discloses another combined packing-dual-flow tray. 25–40 vol % of the total liquid weeps through the opening of the tray deck into the packing. Triangular or rectangular downcomers are installed on the tray deck to split the liquid flow. This is also a combined packing-tray based on a dual-flow tray with downcomers. It also has the defects similar to those of U.S. Pat. No. 5,262,094 to Chuang that the design of the liquid split by the dual-flow tray and the downcomer can not meet the requirement of the practice and the capacity and turndown ratio can not be enhanced.

In brief, there is inherent defect of unstable operation for all the combined packing-trays based on the dual-flow tray and thus it is difficult to meet the requirements of high capacity and high turndown ratio. The present invention aims for overcoming the deficiencies existing in the prior art.

SUMMARY OF THE INVENTION

The object of the present invention is to provide a new combined packing-tray to enable it to offer high capacity and high turndown ratio during operation.

The present invention is accomplished through the following technical solution.

One object of the present invention is to provide a combined packing-tray in a vapor-liquid contacting tower comprising:
  a tray deck;
  a downcomer or several downcomers extending through said tray deck downward; and
  a structure packing layer located in the vapor phase space under said tray deck;
  wherein at certain vapor-liquid load the structural dimensions of said tray deck and said downcomer should be determined such that at least 90 vol % of the total liquid flowing across the tray deck flows downward through said downcomer to the adjacent tray deck below.

Another object of the present invention is to provide a process for effecting an operation with high capacity, high turndown ratio and high separation efficiency in a vapor-liquid contacting tower comprising:
  Providing a combined packing-tray in a vapor-liquid contacting tower which comprises a tray deck; a downcomer or several downcomers extending through the tray deck downward; and a packing layer located in the vapor phase space under the tray deck; wherein at certain vapor-liquid load the structural dimensions of the tray deck and the downcomer should be determined such that at least 90 vol % of the total liquid flowing across the tray deck flows downward through the downcomer to the adjacent tray deck below.

Subjecting the liquid to flowing from the top to the bottom of the tower, the liquid descending from the downcomer of the adjacent tray deck above, traversing the present tray deck and entering into the downcomer of the present tray deck, and substantially no liquid weeping downward through the opening of the tray deck; and Subjecting the vapor to flowing from the bottom to the top of the tower, the vapor ascending through the opening of the tray deck, coming in contact with the liquid flowing horizontally on the tray deck to form a froth so that the contact of the vapor and the liquid on the tray deck is cross-flow bubble contact;

wherein the entrained droplets are removed and the vapor flow is distributed uniformly by action of barrier packing layer when the vapor flows upward through the froth so as to improve mass transfer efficiency and increase operating upper limit and operating turndown ratio.

wherein the numeral 1 is tower body, 2, dowercomer, 3, packing layer, and 4, tray deck.

Figure 1:
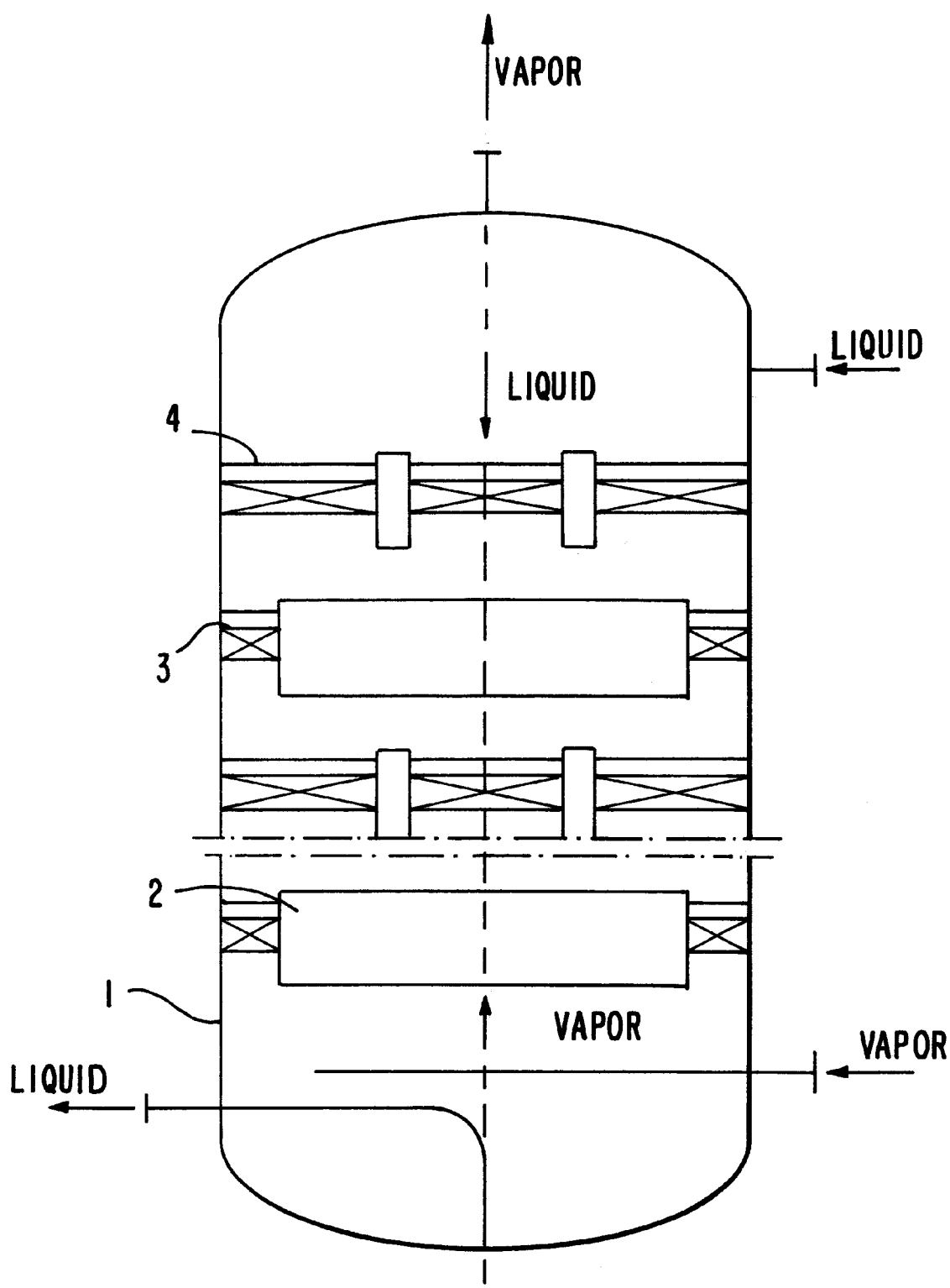
FIG. 1 is a schematic diagram of a combined packing-tray of the vapor-liquid contacting tower according to the present invention.
Figure 2:
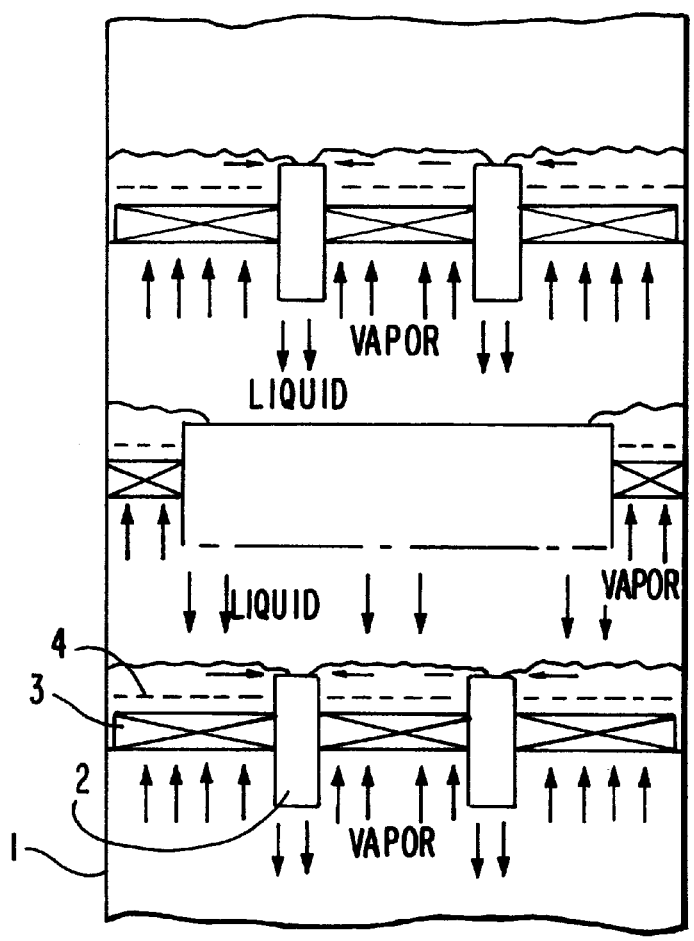
FIG. 2 is a sectional side view of the structure of the combined packing-tray of the vapor-liquid contacting tower according to the present invention (wherein the flowing direction of the vapor and the liquid is designated).
Figure 3:
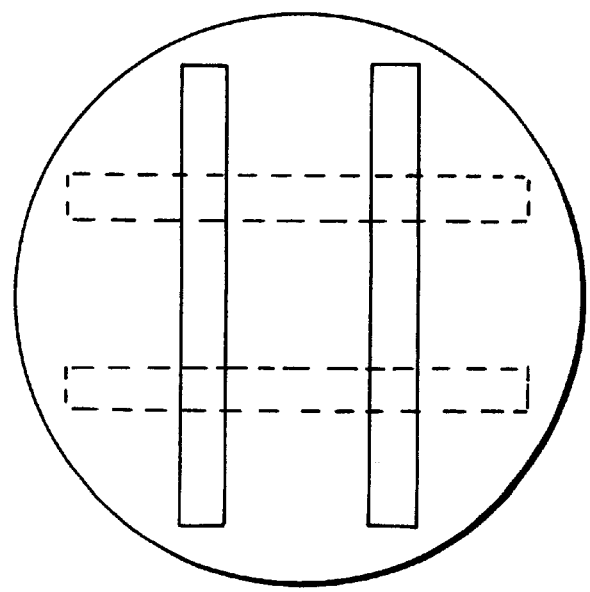

FIG. 3 is a plan view of the combined packing-tray of the vapor-liquid contacting tower according to the present invention.

Figure 4:
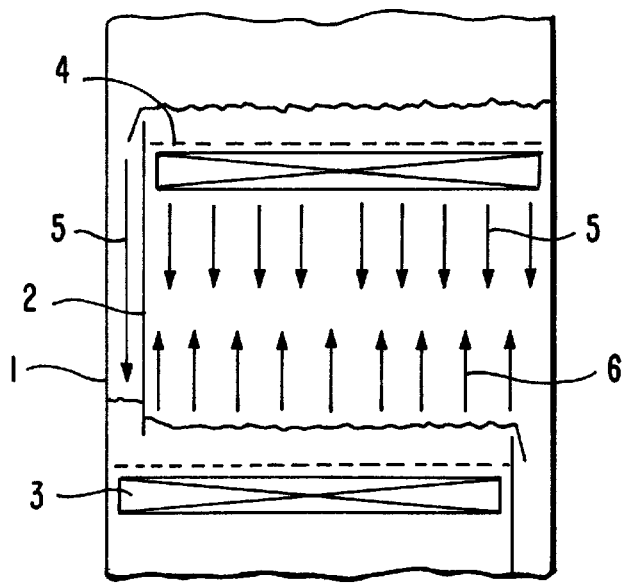

FIG. 4 is a schematic diagram of a combined packing-tray and the flowing direction of the vapor and the liquid in a dual-flow vapor-liquid contacting tower according to the prior art.

Figure 5:
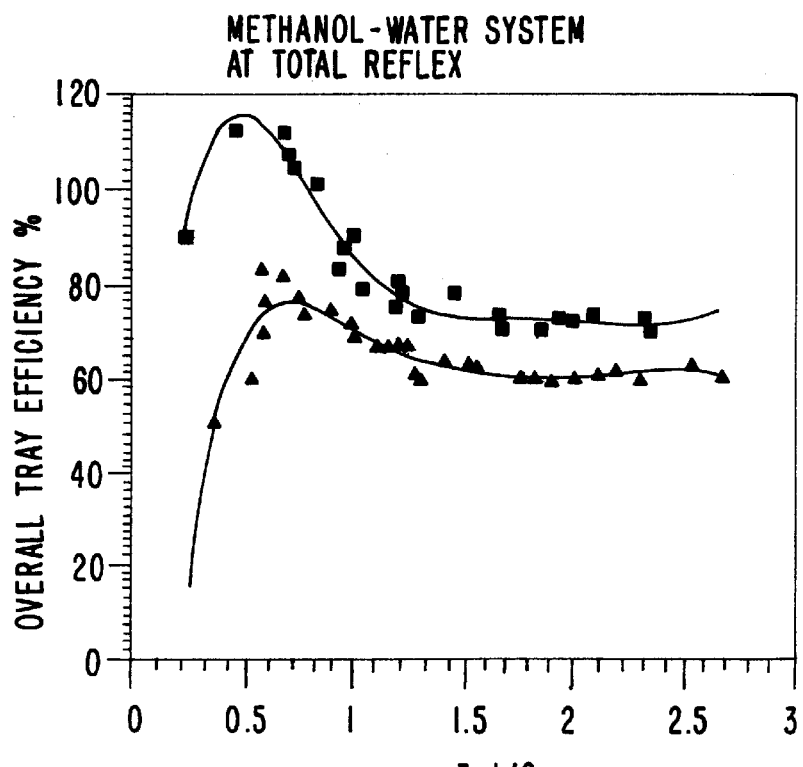

FIG. 5 is the correlation between the tray efficiency and the superficial kinetic energy factor for the methanol-water system. It denotes the comparison between the tray efficiency with combined packing and that without it.

Figure 6:
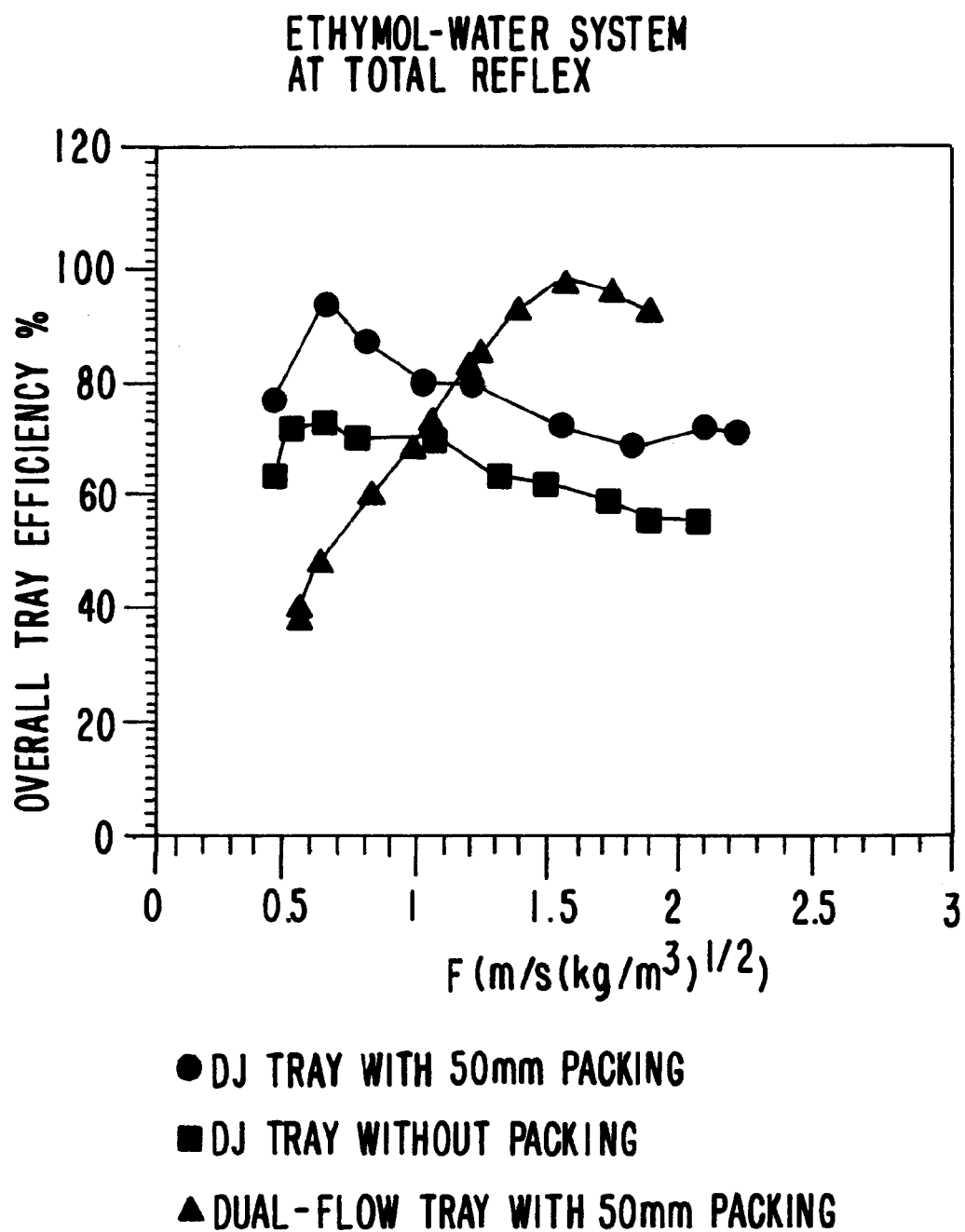

FIG. 6 is the correlation between the tray efficiency and the superficial kinetic energy factor for the ethanol-water system. It denotes the comparison between the tray efficiency with combined packing and that without it, as well as the comparison with the tray efficiency of the dual-flow combined packing-tray.

DETAILED DESCRIPTION OF THE INVENTION

The present invention provides a novel combined packing-tray used in a vapor-liquid cross-flow bubble contacting tower (1). In the tower installed are multiple layers of combined packing-tray, each comprising: a tray deck (4), a downcomer (2) extending downward through the tray deck and a structure packing layer (3) located in the vapor space under the tray deck.

The tray deck used in the present invention may be a conventional sieve tray with an arched downcomer or a float valve tray, or it may also be a rectangular downcomer tray. The rectangular downcomer tray is preferred.

The downcomer used in the present invention extends downward from the tray deck. The upper end of the downcomer above the tray deck forms a overflow weir; the lower end may be immersed in the liquid layer on the adjacent tray deck below or suspended in the vapor phase space above the froth of the adjacent tray deck below.

A structure packing layer used in the present invention is located in the vapor space under the tray deck and at the waist of the downcomer, or in other words, the downcomer extends downward through the packing layer. The packing layer is located at a proper position under the tray deck; the distance between the upper surface of the packing layer and the tray deck is 20–200 mm, the proper distance generally being 30–60 mm. The upper surface of the packing layer is not in contact with the tray deck, so that the re-entrainment of the droplets onto the tray deck above can be barred, and at the same time, a re-distribution space is provided for the vapor. Since the packing layer is loaded in a basket made from iron strips and the basket is fixed to the tray deck by bolts, the too long a distance adds difficulty to the fixation. The distance is optimized by experiments. When the distance increases from 10 mm to 30 mm, the fractionation efficiency enhances markedly; when the distance increases from 30 mm to 60 mm, the fractionation efficiency enhances slightly; when the distance increases from 60 mm to 80 mm, the fractionation efficiency enhances very little. Therefore, a distance smaller than 30 mm or longer than 60 mm is adopted only when there is a special need for the equipment structure. The structure packing may be stainless steel 4.5-type and 250Y-type packings, or it may also be a structure packing of other types. The main function of the packing layer of the present invention is to bar the entrainment of the droplets and therefore only a thin layer is needed. The thickness of the packing layer is 30–100 mm and preferably is 50–80 mm.

According to the present invention, the structural dimensions of the tray deck and the downcomer at a certain vapor-liquid load should be determined such that at least 90 vol %, preferably nearly 100% of the total liquid flowing across the tray deck flows downward through the downcomer to the adjacent tray deck below. For this purpose, the velocity of the vapor flowing through the opening of the tray deck should be greater than the velocity of the vapor at the liquid weeping point, i.e., the stability coefficient (the ratio of the vapor velocity through the opening of the tray deck to the vapor velocity at liquid weeping point) should be greater than 1. Ordinarily, the stability coefficient is 1.5–2. By the structural dimensions of the tray deck and the downcomer herein we mean: the opening area and the opening proportion of the tray, as well as the height and length of the overflow weir and the section area of the liquid passage of the downcomer.

The present invention also provides a process for effecting an operation with high capacity, high turndown ratio and high efficiency in a vapor-liquid cross-flow bubble contacting tower by using a novel combined packing-tray of the present invention. In a vapor-liquid cross-flow bubble contacting tower, the liquid flows from the top to the bottom and the vapor flows from the bottom to the top. The liquid descends from the downcomer of the adjacent tray deck above traverses the present tray deck horizontally and enters the downcomer of the present tray deck and falls onto the adjacent tray deck below. The vapor ascends through the opening of the tray deck, coming in cross-contact with the liquid on said tray deck to form a froth, so that the contact of the vapor and the liquid is a cross-flow bubble contact. Because the design of the structural dimensions of the tray deck and the downcomer of the present invention ensures that at least 90 vol %, even nearly 100% of the total liquid flows through the downcomer from the present tray deck to the adjacent tray deck below, there is substantially no liquid weeping through the opening of the tray deck. The main function of the combined packing is to bar the droplets entrained upward by the vapor. Under normal operations, there is no leakage through the tray deck and no liquid weeping into the packing. Only a small amount of droplets entrained by the vapor are captured in the packing and therefore the packing layer is substantially dry.

The essential difference between the present invention and U.S. Pat. Nos. 5,262,094 and 5,407,605 lies in that the present invention uses the combination of the vapor-liquid cross-flow bubble contacting tray and the packing rather than that combination of the dual-flow tray and the packing; the packing layer is used to bar the entrainment of the droplets, but not as a main mass transfer zone, while the dual-flow combined packing tower takes the packing as a main mass transfer zone. For the dual-flow combined packing-tray without downcomers, the process based on the dual-flow operation is able to enhance the efficiency markedly (by more than 30%), but both the liquid capacity and the downcomers, the liquid capacity may be increased by split flow through downcomers, but a large amount of weeping liquid is still required. The liquid passing through the downcomer and the weeping liquid are mixed on the adjacent tray deck below and thereby the rising extent of the efficiency is lowered. The more serious problem is that the operation can only be carried out at the point close to the designed one because of the split flow of the liquid and therefore the turndown ratio becomes even smaller. The present invention does not pursue to raise the efficiency to a great extent, but just to bar the entrainment of the droplets with the packing and eliminate the factors that affect the efficiency. The application of the cross-flow bubble contacting tower has overcome the limitation of the dual-flow. Although the efficiency only increases by 10–15%, the advantages of high capacity and high turndown ratio are obtained simultaneously and an operation with relatively high efficiency is ensured at the same time.

Tests of a Methanol-Water System and an Ethanol-Water System Carried out for Examining the Efficiency and Turndown Ratio of the Tower The tests were accomplished in a testing tower (having 5 trays) of 76 mm (for the methanol-water system) and a testing tower of 300 mm (for the ethanol-water system) in inner diameter respectively under an overall reflow and atmosphere condition. The results are shown in FIG. 5 and FIG. 6 respectively, wherein the vertical coordinate represents the overall tower efficiency (%), and the horizontal coordinate represents the superficial kinetic contacting factor (product of empty-tower vapor velocity and the square root of vapor density) $(m/s(kg/m^3))^{1/2}$.

It can be seen from the figures that, for the methanol-water and the ethanol-water systems, the efficiency of the tray with combined packing is 10–15% higher than that of the tray without combined packing.

According to the present invention, the packing serves to capture the droplets when the vapor entrains a small amount of liquid droplets and passes through the combined packing layer (3). When the vapor-liquid load increases, the vapor leaves the froth and the entrained droplets also increases.

The capturing unction of the packing layer (3) becomes more remarkable and thereby the high efficiency zone of the efficiency curve gets broader and higher. When the vapor load decreases and the liquid weeping gets more remarkable, the weeping liquid drops uniformly onto the combined packing, allowing the packing to conduct mass transfer with high efficiency and therefore the efficiency curve has a heave in the low load range, indicating the characters of the extension of the lower limit and the broadening of the high efficiency zone.

For the ethanol-water system, a comparative experiment was also conducted between the vapor-liquid cross-flow bubble contacting combined packing-tray of the present invention and the dual-flow combined packing-tray of the prior art, the efficiency curve of the latter is available under 3–10 $m^3/m^2h$ of weeping density (i.e. 0.2–0.7 $m^3/h$ of the liquid amount) (refer to FIG. 6). It can be seen from FIG. 6 that while the peak value of the efficiency is higher, the range of high efficiency region is very narrow, showing poor turndown ratio. This is far inferior to the combined packing-tray of the present invention, which has a very broad high efficiency zone. The turndown ratio of the combined packing-tray of the present invention is 40–50% higher than that of the dual-flow combined packing-tray.

The novel combined packing-tray provided by the present invention has the following advantages.

1. The structure packing layer combined under the tray deck can bar the droplets entrained by the vapor and thus improves the tray efficiency. The vapor entrains the droplets with lower concentration on the present tray deck onto the adjacent tray deck above and thus the liquid with higher concentration is diluted. Therefore, droplet entrainment is a phenomenon of back mixing which affects the efficiency. In the normal distillation operation, the tray efficiency can be reduced by 7%–11% when the droplet entrainment is 5%–10%. The packing layer not only eliminates the entrained droplets, but also uniformly re-distributes the vapor. Moreover, the separated droplets would not be taken onto the adjacent tray deck above again due to the certain distance between the combined packing and the tray deck, and the vapor is also subjected to a re-distribution.

2. The combined packing-tray of the present invention is a vapor-liquid cross-flow bubble contacting tray. The liquid on such a tray substantially does not weep from the opening of the tray deck but only flows downward through the downcomer. Therefore, for the tray uncombined with packing, the inherent turndown ratio is already over 20% higher than that of the ordinary dual-flow tray. After combination, the droplet entrainment is barred and the upper operation limit is raised by over 20%. When the liquid weeping affects the efficiency, the packing layer may play a role of auxiliary mass transfer and thereby reduce the lower limit. Therefore, the turndown ratio of the combined packing-tray is over 30% higher than that of the tray uncombined with packing. The turndown ratio of the present invention is 40%–50% higher compared with the dual-flow combined packing-tray.

3. It can be readily used in the reformation of the existing apparatus for an enlarged capacity. The original trays do not need be changed. The existing problem of exceeding the upper operation limit due to droplet entrainment can be solved and the separation efficiency improved only by fixing a structure packing layer under the tray deck and without altering the original tray deck.

The novel tray deck of the present invention has already been successfully applied in the reformation of propene tower, debutanizing tower, $C_8$ fraction tower in oil refining and petro-chemical production for an enlarged capacity.

As explained heretofore, the structural dimensions of the tray deck and the downcomer should be determined for a given vapor-liquid load such that at least 90 vol % of the total liquid flowing across the tray deck flows downward through the downcomer to the adjacent tray deck located below the downcomer. Preferably, little or no liquid will weep downward through the opening of the tray. An appropriate design of the structural dimensions to accomplish the foregoing should be obvious to one skilled in the art and will be based primarily upon the velocity of vapor and liquid, height and length of weir, as well as the ratio of section area of the downcomer to opening area of the tray deck.

The following is an example of a tray calculation which would cause a flow of liquid of at least 90 vol. % of the total liquid flow through the downcomer to the lower adjacent tray deck.

EXAMPLE

An Example of Tray Calculation in a Cyclohexanol-phenol System:

Rate and properties on the tray

Vapor rate: 0.722 m³/s

Liquid rate: 0.00173 m³/s

Vapor density: 2.81 kg/m³

Liquid density: 940 kg/m³

Liquid surface tension: 32 dyn/cm

Equipment Character:

Diameter: 1200 nm cross-section area of column: 1.13 m²

Tray space: 400 mm

Calculation of Stability Coefficient:

The ratio of length of weir to diameter can be chosen as 0.66 depending on the series of the tray, then Length of weir: $l_W$=0.66D=0.66×1200=794 mm Height of weir: $h_W$=50 mm Liquid height on the weir can be calculated as Francis eq: $h_{OW}$=2.84 E$(L_h/l_W)^{2/3}$ E: can be determined by experimental curves $L_h$: liquid rate per hour (m³/h)

$l_W$: length of weir (m)

$h_{OW}$=2.84×1.035 $(3600×0.00173/0.794)^{2/3}$=11.6 mm hold-up height of liquid on the tray: $h_L$=$h_W$+$h_{OW}$=50+11.6=66.6 mm opening fraction of tray is determined 6% opening area: $A_O$=1.13×6%=0.0678 m² vapor velocity in the holes: $u_O$=0.772/0.0678=11.4 m/s diameter of the hole $d_O$ is determined as 6 mm, the thickness of tray b is determined as 4 mm, since $d_O$/b=1.5, $C_0$ can be determined as 0.78.

surface tension pressure head:

$$h_b = 4 \times \sigma / (9810 \times \rho_L \times d_O)$$

$$= 4 \times 32 / (9810 \times 940 \times 0.006)$$

$$= 0.0023 \, m$$

vapor velocity at the weeping point:

$$u_{OM} = 4.4 C_0 ((0.0056 + 0.13 h_L - h_b) \rho_L / \rho_V)^{0.5}$$

$$= 4.4 \times 0.78((0.0056 + 0.13 \times 0.0616 - 0.0023) \times 940/2.81)^{0.5}$$

$$= 6.68 \, m/s$$

stability coefficient K=: $u_O/u_{OM}$=11.4/6.68=1.71

Weeping velocity $u_{OM}$ used in this example can be determined as the vapor velocity in the sieves when weeping just begin to decrease the tray efficiency. So the weeping point here does not mean that there is absolutely no liquid weeping from the above tray but mean that weeping is begin to decrease the tray efficiency. It is shown in many experiments that, when the amount of weeping is lower that 10% of liquid on the tray weeping would not decrease the tray efficiency. So the Weeping velocity refer to the vapor velocity in the sieves when the amount of weeping make up 10% of liquid on the tray. Therefore, there is about 10% of liquid weeping from the above tray when stability coefficient K just equal to 1. Since the stability coefficient K must be large than 1 in tray design, the vapor velocity in the sieve must be larger than weeping velocity at the weeping point when operating and liquid weeping from sieves must be lower than 10% of liquid on the tray, large stability then can be obtained. In this invention, stability coefficient K of the DJ tray is always larger than 1. Therefore, at least 90% of the liquid will leave for the lower tray from the downcomers.

What is claimed is:

1. In a vapor-liquid contacting tower having multiple combined packing-trays with each combined packing-tray comprising:

a tray deck;

at least one downcomer extending downwardly through said tray deck; and a structure packing layer located in the vapor phase space under said tray deck;

wherein said tray deck and said downcomer are structurally dimensioned for a given vapor-liquid load such that at least 90 vol % of the total liquid flowing across the tray deck flows downward through said downcomer to another tray deck in an adjacent combined packing-tray located below said tray deck and wherein said tray deck has an opening such that vapor ascends upward through the opening to come into contact with the liquid flowing across the tray deck to form a froth in which the vapor and the liquid on the tray deck creates cross-flow bubble contact.

2. In a vapor-liquid contacting tower as defined in claim 1, wherein the structural dimension of the tray deck and the downcomer should be dimensioned such that nearly 100 vol % of the liquid flowing across the tray deck flows downward through the downcomer to said tray deck in the adjacent lower combined packing-tray.

3. In a vapor-liquid contacting tower as defined in claim 1, wherein said tray deck is selected from the group consisting of a rectangular downcomer tray, a conventional sieve tray and a float valve tray.

4. In a vapor-liquid contacting tower as defined in claim 2, wherein said tray deck is selected from the group consisting of a rectangular downcomer tray, a conventional sieve tray and a float valve tray.

5. In a vapor-liquid contacting tower as defined in claim 3, wherein said tray deck is the rectangular downcomer tray.

6. In a vapor-liquid contacting tower as defined in claim 4, wherein said tray deck is the rectangular downcomer tray.

7. In a vapor-liquid contacting tower as defined in claim 1, wherein the said packing is selected from the group consisting of stainless 4.5 type packing and 250 Y-type packing.

8. In a vapor-liquid contacting tower as defined in claim 2, wherein the said packing is selected from the group consisting of stainless 4.5 type packing and 250 Y-type packing.

9. In a vapor-liquid contacting tower as defined in claim 1, wherein the distance between said tray deck and said packing layer is in the range of 20 to 200 mm.

10. In a vapor-liquid contacting tower as defined in claim 2, wherein the distance between said tray deck and said packing layer is in the range of 20 to 200 mm.

11. In a vapor-liquid contacting tower as defined in claim 9, wherein the distance between said tray deck and said packing layer is in the range of 30 to 60 mm.

12. In a vapor-liquid contacting tower as defined in claim 10, wherein the distance between said tray deck and said packing layer is in the range of 30 to 60 mm.

13. In a vapor-liquid contacting tower as defined in claim 1, wherein the thickness of said packing layer is in the range of 30 to 100 mm.

14. In a vapor-liquid contacting tower as defined in claim 2, wherein the thickness of said packing layer is in the range of 30 to 100 mm.

15. In a vapor-liquid contacting tower as defined in claim 13, wherein the thickness of said packing layer is in the range of 50 to 80 mm.

16. In a vapor-liquid contacting tower as defined in claim 14, wherein the thickness of said packing layer is in the range of 50 to 80 mm.

17. A process for operating a vapor-liquid contacting tower for the separation of volatile compounds at high capacity high turndown ratio and high separation efficiency with the vapor-liquid contacting tower having multiple combined packing-trays with each combined packing-tray comprising:

a tray deck having an opening, at least one downcomer extending downwardly through the tray deck; and a packing layer arranged in a vapor phase space located under the tray deck; wherein said tray deck and said downcomer are structurally dimensioned such that at least 90 vol % of the total liquid flowing cross the tray deck flows downward through the downcomer to the tray deck in an adjacent combined packing-tray located below said tray deck;

directing the flow of liquid from the top to the bottom of the tower, such that the liquid descends from the downcomer in the combined packing-tray and enters into the downcomer extending through the tray deck in the adjacent lower combined packing-tray; and subjecting the vapor to flow from the bottom to the top of the tower, such that the vapor ascends through the opening of the tray deck and comes into contact with liquid flowing horizontally on the tray deck to form a froth in which the vapor and the liquid on the tray deck creates cross-flow bubble contact;

wherein the droplets of the entrainment are removed and the vapor flow is distributed uniformly by action of barrier packing layer when the vapor flows upward through the froth so as to improve mass transfer efficiency and increases operating upper limit and operating turndown ratio.

18. The process as defined in claim 17, wherein the tray deck and the downcomer are structurally dimensioned such that nearly 100 vol % of the liquid flowing across the tray deck flows downward through the downcomer to the adjacent tray deck below.

19. The process as defined in claim 17, wherein said tray deck is selected from the group consisting of a rectangular downcomer tray, a conventional sieve tray and a float valve tray.

20. The process as defined in claim 19, wherein said tray deck is the rectangular downcomer tray.

21. The process as defined in claim 17, wherein said packing is selected from the group consisting of stainless 4.5 type packing, 250 Y-type packing and other conventional structure packing.

22. The process as defined in claim 17, wherein the distance between said tray deck and said packing layer is in the range of 20 to 200 mm.

23. The process as defined in claim 20, wherein the distance between said tray deck and said packing layer is in the range of 30 to 60 mm.

24. The process as defined in claim 17, wherein the thickness of said packing layer is in the range of 30 to 100 mm.

25. The process as defined in claim 24, wherein the thickness of said packing layer is in the range of 50 to 80 mm.

* * * * *